United States Patent [19]

O'Haver-Smith et al.

[11] Patent Number: 5,883,024

[45] Date of Patent: Mar. 16, 1999

[54] FIBROUS MAT AND MAT-FACED GYPSUM BOARD

[75] Inventors: Debbie O'Haver-Smith, Lilburn; Alan E. Currier, Atlanta, both of Ga.

[73] Assignee: G-P Gypsum Corporation, Atlanta, Ga.

[21] Appl. No.: 921,501

[22] Filed: Sep. 2, 1997

Related U.S. Application Data

[63] Continuation of Ser. No. 478,322, Jun. 7, 1995, abandoned.

[51] Int. Cl.⁶ .................................................... C04B 02/10
[52] U.S. Cl. .......................... 442/333; 442/149; 442/173; 442/180; 442/331; 442/332; 106/772; 106/778; 106/782
[58] Field of Search ...................................... 106/772, 778, 106/782; 442/149, 173, 180, 331, 332, 333

[56] References Cited

U.S. PATENT DOCUMENTS 5,308,692  5/1994  Kennedy et al. ........................ 428/290

*Primary Examiner*—Helen L. Pezzuto
*Attorney, Agent, or Firm*—Synnestvedt & Lechner

[57] ABSTRACT

Disclosed are fibrous mat-faced gypsum boards with improved resistance to skin irritation and itching. The boards include a mat facing in which the fibrous portion thereof comprises both inorganic and organic fibers, with organic fibers preferably being present in amount from about 5% to about 25% by weight of the total fibers.

20 Claims, No Drawings

5,883,024

FIBROUS MAT AND MAT-FACED GYPSUM BOARD

This application is a continuation, of application Ser. No. 08/478,322 filed Jun. 7, 1995, now abandoned.

FIELD OF THE INVENTION

The present invention relates to an improved fibrous mat of the type especially well adapted for use as a facing material for gypsum board.

Fibrous mats have utility in a wide variety of applications. One application which has become increasingly important during the past several years is as a facing material for gypsum wallboard. Panels of gypsum wallboard having a core of set gypsum sandwiched between two sheets of facing material have long been used as structural members in the fabrication of buildings. Such members are commonly used to form the is partitions or walls of rooms, elevator shafts, stairwells, ceilings, roof decks, and the like. Although paper sheets have long been used as the facing material for gypsum board of this type, facing materials formed of a fibrous mat have enjoyed a substantial increase in popularity, due in large part to the technologies described in the following U.S. Patents: U.S. Pat. No. 4,647,496; U.S. Pat. No. 4,810,569; U.S. Pat. No. 4,849,173; U.S. Pat. No. 5,148,645; U.S. Pat. No. 5,220,762; U.S. Pat. No. 5,319,900; U.S. Pat. No. 5,342,680; U.S. Pat. No. 5,371,989 and U.S. Pat. No. 5,397,631, each of which is assigned to the assignee of the present invention and incorporated herein by reference. These patents disclose generally gypsum wallboard faced on at least one surface thereof with a fibrous mat comprising glass fibers bound together by an adhesive binder.

Gypsum wallboard of the type disclosed in the above patents has been commercialized and is presently being used effectively in more and more applications. Such applications include those in which paper-faced gypsum board is considered unsuitable for use or in which the use of fibrous mat-faced gypsum board has been recognized to be an advantage.

In general, fibrous mat-faced gypsum board of the type described in the above patents has certain characteristics considered to be more desirable than those of paper-faced gypsum board. For example, the surface of fibrous mat-faced gypsum board is water resistant, whereas conventional paper coverage sheets used to face gypsum board tend to soak-up water and to delaminate upon becoming wet. Accordingly, the fibrous mat-faced board has much better weathering characteristics in outdoor applications, particularly those forms of board which include a water resistant additive in the gypsum core of the board. Unlike a paper cover sheet, a fibrous mat does not expand or contract during the manufacture of the board; this reduces cockle and permits the manufacture of board with uniform dimensions.

A family of commercial embodiments of gypsum board in accordance with the above noted patents is sold by Georgia-Pacific Corporation under the trademarks DENS GLASS® GOLD, DENS-SHIELD®, DENS CORE® and DENS-DECK®. These commercial prior art products included a board faced with a glass fiber mat in which the fibers were all inorganic glass fibers bound together with a urea-formaldehyde adhesive. The inner portion of the glass mats was bound to the board by set gypsum from the core penetrating but part way into the mat such that the outer surface of each of the glass mats was substantially free of set gypsum. These DENS brand products have many of the advantageous features described hereinbefore, and the presence of such features has contributed significantly to the commercial success of this family of products.

Notwithstanding the above, applicants have noted that yet further improvements in mat-faced gypsum board are possible. For example, itching and other skin irritation has sometimes been cited as a disadvantage of the glass fiber mats previously used to face such boards. More particularly, discomforting contact between the skin and such mats is said to sometimes occur when the boards are handled, such as in packaging of the boards, transportation of the boards to a job site, and installation of the boards.

While it may be possible to eliminate this skin irritation problem by simply coating the mat with a substance that embeds the glass fibers below the surface of the board, this solution can be less than satisfactory in several respects. For example, certain of such coatings may detrimentally reduce the fire resistant characteristics of the board. Furthermore, the presence of fibers on the surface of such gypsum boards can be desirable in certain circumstances. For example, the presence of fibers of the surface of the boards can help to improve adhesive bonding between the board and other materials to which the board may be joined, such as in exterior insulation finishing systems.

SUMMARY OF THE INVENTION

Applicants have discovered fibrous mats and fibrous mat-faced gypsum boards in which the difficulty of skin irritation and itching is substantially reduced without sacrificing the beneficial properties associated with prior mats and boards. This desirable result is achieved by careful selection of the type of fibers and adhesives used to form the glass mat. More specifically, applicants have surprisingly found that a substantial and highly beneficial reduction in skin irritation can be achieved by the utilization of a glass mat in which the fibrous portion thereof comprises a major proportion by weight of inorganic fibers, such as glass fibers, and a minor proportion by weight, preferably from about 5% to about 25% by weight, of organic fibers. Furthermore, applicants have discovered that a reduction in skin irritation is also achieved by the use of an adhesive which is sufficiently soft and flexible to bend without fracture or breaking as the mat is handled.

One aspect of the present invention provides a gypsum board comprising a set gypsum core having adhered to at least one of its surfaces a glass fiber mat in which the fibers comprise inorganic fibers in major proportion and organic fibers in minor proportion. One aspect of this embodiment of the invention is that it is possible to manufacture a mat-faced gypsum board with reduced irritation characteristics without any substantial detrimental change in the manufacturing processes or beneficial characteristics described in the above-identified patents.

DETAILED DESCRIPTION OF THE INVENTION

I. The Fibrous Mats

Fibrous mats in accordance with the present invention generally comprise fibers and binder for the fibers. The fibrous mats may comprise randomly oriented fibers or fibers oriented in a regular pattern, such as a woven pattern. In addition, it is contemplated that the fibrous mats of the present invention may include portions thereof in which certain of the fibers are randomly distributed and in which other portions thereof are in a pattern configuration. In general, however, the use of fibrous mats having fibers randomly oriented with respect to one another is preferred primarily due to cost factors. The fiber from which the mat is formed can comprise continuous discreet strands of fibers and may be woven or non-woven in form. Non-woven mats such as chopped strand mat and continuous strand mat can be used satisfactorily and are less costly than woven materials. The mat can range in thickness, for example, from about 15 to about 40 mils, with a thickness of about 25 to about 35 mils being preferred.

In highly preferred form, the mat is a fiberglass mat in which the fibrous portion thereof comprises glass fibers and polyester fibers oriented in a random pattern. These fibers are preferably bound together with a resinous adhesive. Preferred aspects of the fibers and the adhesive are provided immediately hereinafter.

A. The Fibers

The fibers used in the fibrous mats of the present invention comprise both organic and inorganic fibers, with the inorganic fibers being present in major proportion and organic fibers being present in minor proportion, based on the total weight of fibers in the mat.

Although it is contemplated that various types of inorganic fibers may be used in accordance with the present invention, it is generally preferred that the inorganic fiber comprise, and preferably consist essentially of, glass fibers. Of course, combinations of inorganic fibers may also be used.

Mats which are formed predominantly from glass fibers are known in the art and referred to herein as glass fiber mats. Thus, the preferred fibrous mats of the present invention are glass fiber mats in which the fibrous portion thereof is comprised of at least about 50% by weight of glass fibers, and even more preferably at least about 75% by weight of glass fibers.

An important and critical aspect of the present invention is the presence of from about 10% by weight to about 25% by weight of organic fibers in the fibrous portion of the mats of the present invention. In especially preferred embodiments, the fibrous mat is a glass fiber mat in which the fibrous portion comprises from about 70% by weight to about 90% by weight of inorganic fibers and from about 10% by weight to about 25% by weight of organic fibers.

In general, it is contemplated that a wide variety of organic fibers may be used with advantage in the present mats. For example, the organic fibers may comprise resinous organic fibers, including thermoplastic fibers such as polyester fibers, polyamide fibers (Nylon fibers); polyolefins, including polypropylene; aramids and combinations of two or more of these, with polyester fibers being preferred.

Applicants have surprisingly, unexpectedly and counter-intuitively found that the presence of organic fibers in the fiber mats of the present invention results in a beneficial reduction in skin irritation associated with the handling of such mats. More specifically, applicants have surprisingly found that as little as 10 wt. % of organic fibers, such as polyester fibers, in glass fiber mat substantially reduces the skin irritation caused by such mats notwithstanding that substantial quantities of glass fibers are nevertheless exposed to the skin of the person handling the mat. On the other hand, the use of a fibrous mat in which the fibrous portion thereof comprises less than about 5% by weight of organic fibers does not substantially reduce the irritation associated with handling such mats. Mats in which the fibrous portion comprises about 15 wt. % organic fiber is most preferred. The physical phenomena which causes the reduced irritation exhibited by the mats of the present invention is not understood.

The anti-itch characteristics of the fibrous mats of the present invention are found to generally improve with increasing concentration of organic fibers up to a limit of about 20% by weight based on the total weight of fibers, after which no substantial increase in anti-itch characteristics is observed.

As mentioned hereinbefore, the mats of the present invention are especially well adapted for use as facings on gypsum wallboard and similar products. As will be appreciated by those skilled in the art, one substantial advantage of previous gypsum wallboard products faced with glass fiber mat is the fire resistant characteristic of such boards. More specifically, the use of essentially 100% glass fibers in the glass mats of prior art gypsum boards resulted in products having desirably low flame spread characteristics. The non-combustibility of the glass fibers used to form the prior mats is one obvious and significant factor contributing to the flame retardant characteristic of prior wallboard products.

Once again, however, applicants have surprisingly and unexpectedly found that little or no deterioration in fire-resistant properties occurs with the use of mats in accordance with the present invention. This is true notwithstanding the presence of organic fibers in the present mat, provided, however, that the concentration of organic fibers in the fibrous portion of the mat is no greater than about 25% by weight. More specifically, the mats of the present invention preferably exhibit a flame spread of about 5, and even more preferably of about 0, as measured in accordance with ASTM E-84. For applications in which fire resistance and flame spread characteristics are particularly important, the fibrous portion of the glass mats of the present invention preferably comprise from about 10% to about 25% by weight of organic fibers, and even more preferably from about 12% to about 20% by weight of organic fibers.

With respect to fiber size, it is expected that numerous and various fiber sizes may be utilized in accordance with the present invention, depending upon the particular desired end application. Furthermore, it is contemplated that the size of the organic and inorganic fibers may be the same or different. In general, however, it is preferred that the inorganic fibers which make up the fibrous portion of the mats of the present invention range in size from about H fibers to about P fibers (about 10 microns in diameter to about 20 microns in diameter). With respect to the organic fibers, it is generally preferred to utilize fibers of from about ½ to about 2½ denier.

B. The Adhesive

The fibrous mats of the present invention also preferably comprise an adhesive, and preferably a resinous adhesive binder composition, for holding the fibers in the form of a mat. In general, the method of forming the mats of the present invention, including the incorporation of binder therein, is not of the essence of this invention, and all known techniques for performing this function are within the scope hereof. Thus, it is contemplated that any one of well known binders and binder incorporation techniques may be selected to achieve the particular result desired for the particular application in question. In general, however, applicants have found that the use of urea-formaldehyde resins, which were heretofore commonly used, are not preferred.

Although applicants do not intend to be necessarily bound by or limited to any particular theory of operation, it is believed that the enhanced anti-itch characteristics associated with the preferred adhesive used in the mats of the present invention is due, at least in part, to the relative softness and flexibility of the preferred adhesive resins as opposed to the non-preferred urea-formaldehyde resins. More specifically, the relative stiffness and inflexibility of urea-formaldehyde type resinous adhesives produce an uncomfortable and potentially irritating hand or "feel" to conventional glass mats. In contrast, the preferred resin adhesives in accordance with the present invention are relatively soft and flexible, relative to urea-formaldehyde, thereby producing an improved hand or feel, which in turn tends to reduce the irritation and discomfort associated with such mats. Moreover, it is contemplated that the relatively brittle nature of urea-formaldehyde resins may produce an increased number of "points" and/or fiber ends when the mat is bent or otherwise stressed during handling. Accordingly acrylic-based binders and PVC-based binders are preferred for use in the mats of the present invention. It is believed that the relatively flexible nature of the preferred acrylic adhesives in accordance with the present invention reduces the brittleness of the mat and thereby decreases the number of irritating points and fiber ends to which the skin is exposed. This in turn is believed to possibly enhance the anti-itch characteristics exhibited by the mats of the present invention.

The amount of adhesive used to produce the mats in accordance with the present invention may also vary widely, depending upon numerous factors, such as binder type, fiber type, and desired end application. In general, however, fibrous mats of the present invention preferably comprise from about 65 wt. % to about 85 wt. % of fibrous material and from about 15 wt. % to about 35 wt. % binder. The use of from about 20 to about 25 wt. % binder is even more preferred. As is known to those skilled in the art, the principal function of the adhesive is to hold the fibrous portion of the mat in the proper configuration, and such adhesives are typically and frequently applied by spray or other means during or shortly after formation of the fibers from a hot melt.

C. Other Components

In addition to the adhesive described above, it is also contemplated that certain embodiments of the present invention may further incorporate a secondary reinforcing binder of the type disclosed in U.S. Pat. No. 5,342,680, which has been incorporated herein by reference. According to preferred embodiments, the secondary reinforcing resinous binder is applied to the surface of the mat and supplements the adhesive described above. Such reinforcing resinous binder, when present, is preferably present in an amount of at least 3 g./sq. meter of mat.

The secondary reinforcing resinous binder that is applied to the fibrous mat can be any polymeric material that is capable of adhering strongly to the mat, and is preferably a material that is considered by the art to be water-resistant and heat-resistant and, most preferably, alkaline-resistant also. It is desirable also that the secondary binder have anti-blocking characteristics. There are many commercially available resins that possess the aforementioned characteristics. The secondary binder can comprise a single resin or a mixture of resins and can be thermoplastic or a thermoset resin. For most applications, the secondary binder is likely to be a resin which is different from the adhesive which holds together the fibers of the mat. However, the same resin, or combinations of resins, can be used for the reinforcing binder and for the adhesive.

II. The Gypsum Boards

An important aspect of the present invention is the provision of mat-faced gypsum products which include the fibrous mat of the present invention. The mat-faced gypsum board of the present invention comprises a set gypsum core faced with the present fibrous mat. The term "mat-faced" is used herein to mean that the mat is located at or near the surface of the board, and thus contemplates boards in which the mat may be below the surface of the board as a result of embedment in a surface coating.

Numerous and varied techniques are known and available for manufacturing mat-faced gypsum board, and all such techniques are believed to be adaptable for use in accordance with the invention described herein. In general, however, the present boards are preferably manufactured according to the techniques disclosed in U.S. Pat. 4,647,496. According to such techniques, the gypsum core is basically of the type used in gypsum-based structural products commonly known as gypsum wallboard, dry wall, gypsum board, gypsum lathe, gypsum panel and gypsum sheathing. The core is formed by mixing water with powdered anhydrous calcium sulfate ($CaSO_4$) or calcium sulfate hemihydrate ($CaSO_4.\frac{1}{2}H_2O$), also known as calcined gypsum, and thereafter allowing the mixture to hydrate or set into calcium sulfate dihydrate ($CaSO_4.2H_2O$), a relatively hard material. The core of the product generally comprises at least about 85 wt. % of set gypsum.

The composition from which the set gypsum core is made can include optional constituents, including, for example, those included conventionally in fire-resistant gypsum board and in water-resistant gypsum board. Examples of such constituents include set accelerators, retarders, foaming agents, dispersing agents, water resistant additives and fire resistant additives.

In many applications, it is desirable for the core of the fibrous mat-faced gypsum board to include a water resistant additive, preferably in an amount such that the core absorbs no more than about 10% by weight, and preferably no more than about 5% by weight, of water when tested in accordance with ASTM method C-473 with only the edges exposed. One such application includes use of such a board as a member for a built-up roof, as disclosed in U.S. Pat. No. 5,342,680, which is assigned to the assignee of the present invention and which is incorporated in its entirety herein by reference. Preferred materials for use in improving the water resistant properties of such gypsum board are disclosed in detail in the aforesaid patent.

The core material of the present invention also optionally includes fire resistant additives, preferably of the type and in the amounts disclosed in U.S. Pat. No. 4,664,707, which is incorporated herein by reference.

As mentioned above, an important feature of the present invention is that the improved fibrous mat-faced gypsum board can be made utilizing an existing manufacturing line without any substantial change thereto. More specifically, the dry ingredients from which the gypsum core is formed are pre-mixed in conventional fashion and then fed to a mixer of the type commonly referred to in the industry as a pin mixer. Water and other liquid constituents used in making the core are metered into the pin mixer where they are combined with the dry ingredients to form an aqueous gypsum slurry. Foam is generally added to the slurry in the pin mixer to control the density of the resulting core. The slurry is disposed through one or more outlets at the bottom of the mixer onto a moving sheet (hereinafter referred to as the bottom sheet) which is of indefinite length and which is fed from a roll thereof.

As is common practice in the manufacture of conventional paper-faced gypsum board, the two opposite edge portions of the bottom sheet are progressively flexed upward from the main plane thereof and then turned inwardly at the margins so as to provide coverings for the edges of the resulting board. A second sheet (hereinafter referred to as the top sheet) of indefinite length is fed from a roll thereof onto the top of the slurry, thereby sandwiching the slurry between the two moving sheets which form the facings of the said gypsum core which is formed from the slurry. Conventional shaping rolls and edge guarding devices are used to shape and maintain the edges of the composite until the gypsum has set sufficiently to retain its shape.

The fibrous mat of the present invention is used for at least one of the facing sheets, and preferably both the top and the bottom sheet, of the gypsum board. It is believed that, for many applications, it would be advantageous to manufacture a board having both surfaces faced with a fibrous mat in accordance with the present invention, with each such mat having a substantially gypsum-free surface. Thus, the surface of at least either the top or bottom sheet, and preferably both sheets, is preferably substantially free of set gypsum and comprises relatively free fibers and or fibrous ends with unfilled interstices therebetween. Such interstices may be beneficial, for example, to aid in the application of a secondary resinous binder to the surface of the sheet or to aid in adhering exterior finishing systems to the board of the present invention.

The formation of gypsum board with at least one facing mat being substantially free of set gypsum from the core can be accomplished by known means, for example, by adjusting the viscosity of the gypsum slurry so that it penetrates but part way into the underlying and/or the overlying fibrous mat. The recommended known means for controlling the viscosity of the slurry is to add thereto a viscosity control agent, such as paper fiber. Examples of other agents that can be used are cellulose thickeners, bentonite clays and starches. The particular viscosity values that are used in manufacturing operation can vary from one application to the next, depending upon the porosity of the mat, and the desired penetration of the slurry. According to certain embodiments, however, it is preferred that the gypsum slurry have a viscosity within the range of about 5,000 to about 7,000 centipoise (cp). As used herein, the viscosity value refers to Brookfield viscosity measured at a temperature of about 70° F. at 10 rpm utilizing paddle No. 3. Such viscosity control means are disclosed in U.S. Pat. No. 4,647,496.

In view of the above, applicants have discovered a unique, practical and economical way to improve the properties of fibrous mat-faced gypsum board and to overcome or mitigate problems associated with the fibrous facing thereof, particularly fibrous mats of the non-woven type which contain a substantial amount of glass fibers. Applicants' inclusion of from about 5 to about 25% by weight of organic fibers in such a mat has surprisingly and counterintuitively resulted in a substantial decrease in the skin irritation caused as a result of handling such mats. As a result, the mats of the present invention can be used with great benefit as the facings in numerous gypsum wallboard applications.

III. Applications

The gypsum boards of the present invention are adaptable for use in numerous applications. For example, gypsum boards of the present invention may be used in both interior and exterior construction applications. With respect to exterior construction, the present boards may be used in exterior finishing systems, such as exterior insulation finishing systems (known as EIFS) of the type disclosed in U.S. Pat. No. 4,647,496 and U.S. Pat. No. 4,810,569. Other exterior finishing applications include roof deck systems as disclosed in U.S. Pat. No. 5,319,900.

The present gypsum boards may also be used in interior applications, such as interior lath systems, as disclosed in U.S. Pat. No. 5,220,762, and in shaft wall assemblies as disclosed in U.S. Pat. No. 5,148,645.

The boards in accordance with the present invention may also be used in the construction of doors, and particularly as the core in a fire-door construction, as disclosed in U.S. Pat. No. 4,811,538.

What is claimed is:

1. An improved mat-faced gypsum board of the class comprising a gypsum-based core and a fibrous mat comprising fibers and adhesive for said fibers facing at least one side of said core, the improvement characterized by said fibers comprising at least about 50% by weight inorganic fibers and from about 10% by weight to about 25% by weight of organic fibers.

2. The gypsum board of claim 1 wherein said inorganic fibers comprise glass fibers.

3. The gypsum board of claim 1 wherein said organic fibers comprise polyester fibers.

4. The gypsum board of claim 1 wherein said inorganic fibers comprise glass fibers and wherein said organic fibers comprise polyester fibers.

5. The gypsum board of claim 4 wherein said inorganic fibers consist essentially of glass fibers and wherein said organic fibers consist essentially of polyester fibers.

6. The gypsum board of claim 1 wherein said fibers comprise from about 70% to about 90% by weight of inorganic fibers.

7. The gypsum board of claim 6 wherein said fibers comprise from about 12% to about 20% by weight of organic fibers.

8. The gypsum board of claim 7 wherein said organic fibers comprise of polyester fibers.

9. The gypsum board of claim 8 wherein said organic fibers consist essentially of polyester fibers.

10. An improved mat-faced gypsum board comprising a gypsum-based core and a fibrous mat facing at least one side of said core, said fibrous mat comprising:

(a) fibers comprising:
  (i) from about 70% by weight to about 90% by weight of randomly oriented glass fibers;
  (ii) from about 10% by weight to about 25% by weight of randomly oriented organic fibers; and
(b) adhesive holding said fibers substantially in the form of a mat.

11. The gypsum board of claim 10 wherein said adhesive comprises acrylic resin.

12. The gypsum board of claim 10 wherein said adhesive is a relatively soft, flexible resinous adhesive.

13. The gypsum board of claim 10 wherein said glass fibers have a diameter of substantially from about 8 micron to about 17 micron.

14. The gypsum board of claim 10 wherein said organic fibers have a diameter of substantially from about ½ denier to about 2 denier.

15. An improved fire-resistant mat-faced gypsum board having reduced skin irritation characteristics and being of the class comprising a gypsum-based core and a fibrous mat comprising fibers and adhesive for said fibers facing at least one side of said core, the improvement characterized by said fibers comprising at least about 50% by weight inorganic fibers and from about 10% by weight to about 25% by weight of organic fibers, wherein said mat has a flame spread of no greater than about 5 as measured in accordance with ASTM E-84.

16. The gypsum board of claim 15 wherein said mat has a flame spread of about 0 as measured in accordance with ASTM E-84.

17. The gypsum board of claim 15 wherein said inorganic fibers comprise glass fibers and wherein said organic fibers comprise polyester fibers.

18. The gypsum board of claim 15 wherein said inorganic fibers consist essentially of glass fibers and wherein said organic fibers consist essentially of polyester fibers.

19. The gypsum board of claim 15 wherein said fibers comprise from about 70% to about 90% by weight of inorganic fibers.

20. The gypsum board of claim 19 wherein said fibers comprise from about 12% to about 20% by weight of organic fibers.

* * * * *

UNITED STATES PATENT AND TRADEMARK OFFICE
CERTIFICATE OF CORRECTION

PATENT NO. : 5,883,024
DATED : March 16, 1999
INVENTOR(S) : Alan E. Currier and Debbie O'Haver-Smith It is certified that error appears in the above-indentified patent and that said Letters Patent is hereby corrected as shown below:

On the title page, item 75, the order of inventors should read —Alan E. Currier, Atlanta; Debbie O'Haver -Smith, Lilburn—. Column 1, Line 18, delete "is".

Signed and Sealed this

Nineteenth Day of October, 1999

Attest:

Q. TODD DICKINSON

*Attesting Officer*   *Acting Commissioner of Patents and Trademarks*